(12) United States Patent
Kuhlmann

(10) Patent No.: US 6,968,807 B2
(45) Date of Patent: Nov. 29, 2005

(54) CAGE ARRANGEMENT FOR POULTRY

(75) Inventor: Josef Kuhlmann, Laer (DE)

(73) Assignee: Farmer Automatic Josef Kuhlmann GmbH & Co. KG, Laer (DE)

(*) Notice: Subject to any disclaimer, the term of this patent is extended or adjusted under 35 U.S.C. 154(b) by 0 days.

(21) Appl. No.: 10/753,898

(22) Filed: Jan. 7, 2004

(65) Prior Publication Data
US 2004/0144329 A1    Jul. 29, 2004

(30) Foreign Application Priority Data
Jan. 9, 2003 (DE) .......................... 203 00 221 U

(51) Int. Cl.[7] .................................... A01K 31/04
(52) U.S. Cl. ............................ 119/458; 119/479
(58) Field of Search ................... 119/458, 455, 442, 119/28.5, 450, 451, 447, 479; 15/93.1, 93.4

(56) References Cited

U.S. PATENT DOCUMENTS

| | | | | |
|---|---|---|---|---|
| 731,003 A | * | 6/1903 | Willis, Jr | 198/743 |
| 2,383,326 A | * | 8/1945 | Lovell | 119/458 |
| 2,601,844 A | * | 7/1952 | Lovell et al. | 119/458 |
| 2,970,567 A | * | 2/1961 | Rubin | 119/458 |
| 2,984,338 A | * | 5/1961 | Pockman et al. | 198/741 |
| 3,768,442 A | * | 10/1973 | Van Huis | 119/457 |
| 3,783,829 A | * | 1/1974 | Siciliano | 119/455 |
| 3,810,444 A | * | 5/1974 | Conley | 119/442 |
| 4,242,809 A | * | 1/1981 | Elder | 34/498 |
| 4,321,887 A | * | 3/1982 | Martin et al. | 119/458 |
| 4,335,681 A | * | 6/1982 | Holland | 119/458 |
| 4,357,904 A | * | 11/1982 | Kuhlmann | 119/442 |
| 4,480,588 A | * | 11/1984 | Holladay et al. | 119/455 |
| 4,489,675 A | * | 12/1984 | Siciliano | 119/442 |
| 4,697,547 A | * | 10/1987 | Malestein | 119/457 |
| 5,450,815 A | * | 9/1995 | Krehl et al. | 119/458 |
| 5,570,657 A | | 11/1996 | Kuhlmann | |
| 5,901,665 A | * | 5/1999 | Lackner | 119/458 |

* cited by examiner

*Primary Examiner*—Robert P. Swiatek
(74) *Attorney, Agent, or Firm*—Merchant & Gould P.C.

(57) ABSTRACT

The invention relates to a cage arrangement for poultry having cage batteries arranged above a manure pit, each battery displaying two cages facing each other, the cages being placed one atop another in tiers, in which arrangement

- a manure scraper is arranged in each tier underneath each cage;
- between two cages facing each other an open space is present;
- under the open space, a passage is present in the cover plate of the manure pit for the manure conveyed into the open space by the manure scrapers;
- and the manure scrapers are driven in an back-and-forth manner.

3 Claims, 3 Drawing Sheets

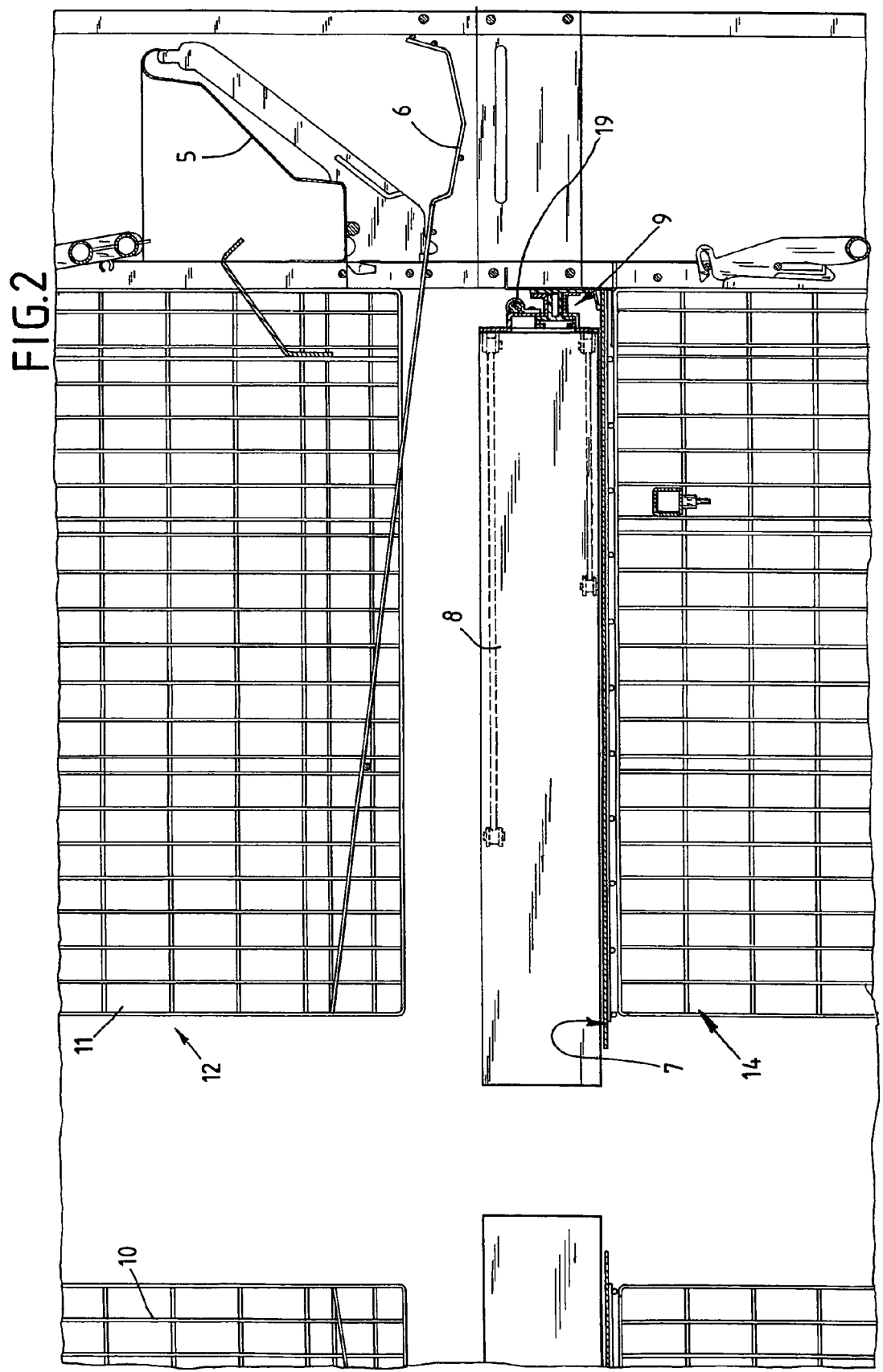

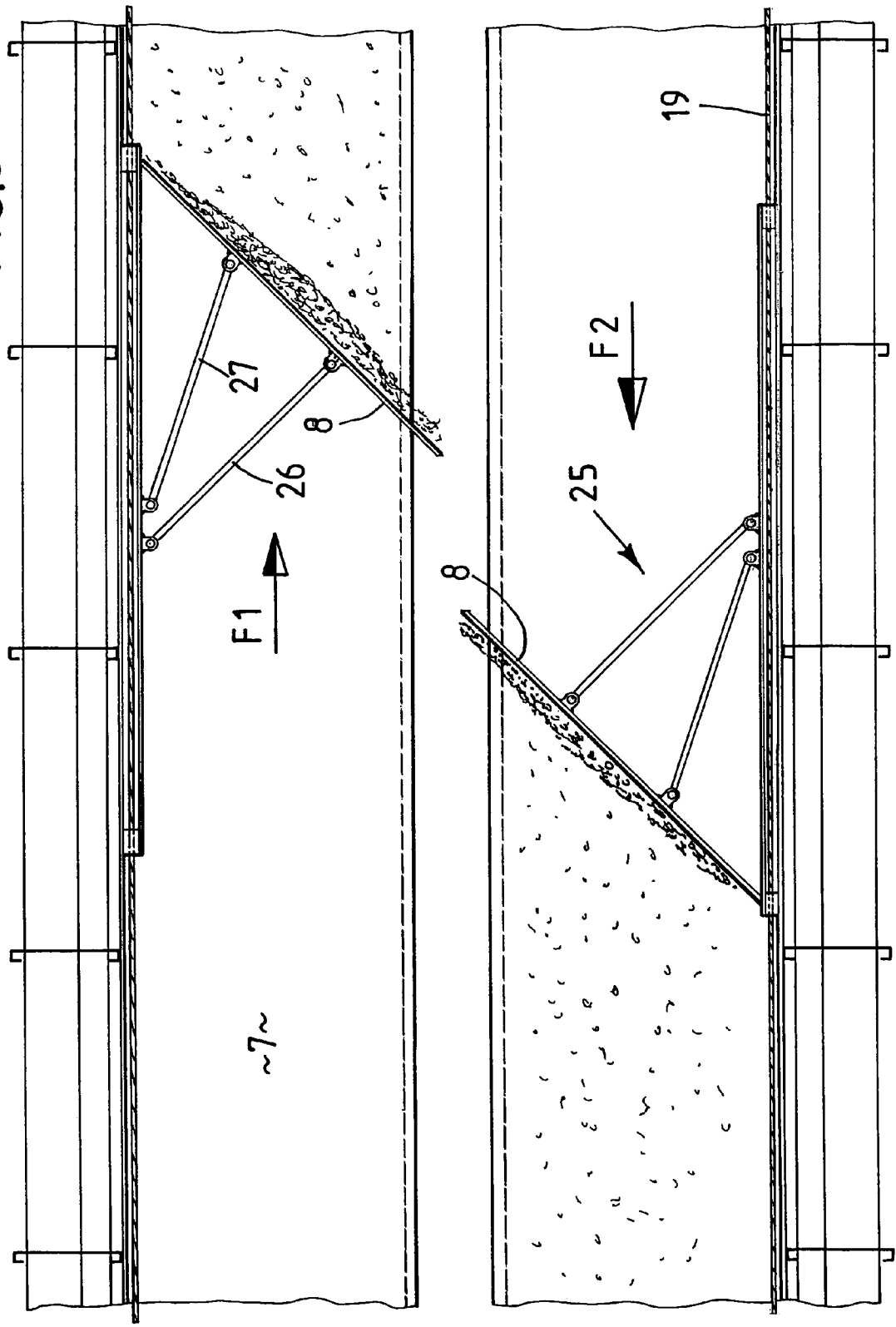

CAGE ARRANGEMENT FOR POULTRY

The invention relates to a cage arrangement for poultry having cage batteries arranged above a manure pit, each battery displaying two cages facing each other, which cages are arranged one atop another in tiers.

Such cage arrangements are known in the art. Thus, for example, described in US-PS 55 70 657 is a cage arrangement in which the actual cage bottom is designed in a folding manner.

In these known cages, situated underneath the cage arrangement is a conveyor belt, which releases the manure of the animals at the front of the battery of cages.

The invention relates to a cage arrangement in which the manure is not released at the front of an extended battery, but rather, the manure falls through the cage bottom onto a so-called manure plate and from here is conveyed by scrapers to the center that lies between the two cages, facing each other, of a cage battery. Here, the manure drops and arrives in a manure pit.

Thus, according to the invention it is proposed that in each tier a manure scraper be arranged underneath each cage, and that an open space be present between two cages facing each other, while underneath the open space the cover plate of the manure pit has an aperture for the manure that is conveyed into the open space by the manure scrapers, and the manure scrapers are driven in a back-and-forth manner.

The manure scrapers are arranged on a traction cable that circulates around idler pulleys, with the inclusion of a drive pulley that propels the traction cable back and forth.

Provided above each cage is a manure plate, on which the associated manure scraper glides.

The cages of the upper tier are connected to each other so as to bridge the free space, whereby the stability of the arrangement is increased.

By these means, the manure is conveyed into the manure pit over the entire length of the cage battery and not only at the end of the cage battery, resulting in a better distribution of the manure in the manure pit. In the manure pit, the manure that has thus arrived centrally through the passage, which manure builds up in a conically-extended manner, is evenly distributed at certain intervals, and at the same time, as is known in the art, the manure in the manure pit is ventilated, so that it dries. An emptying of the manure pit then takes place approximately yearly or semi-yearly.

Figure 1:
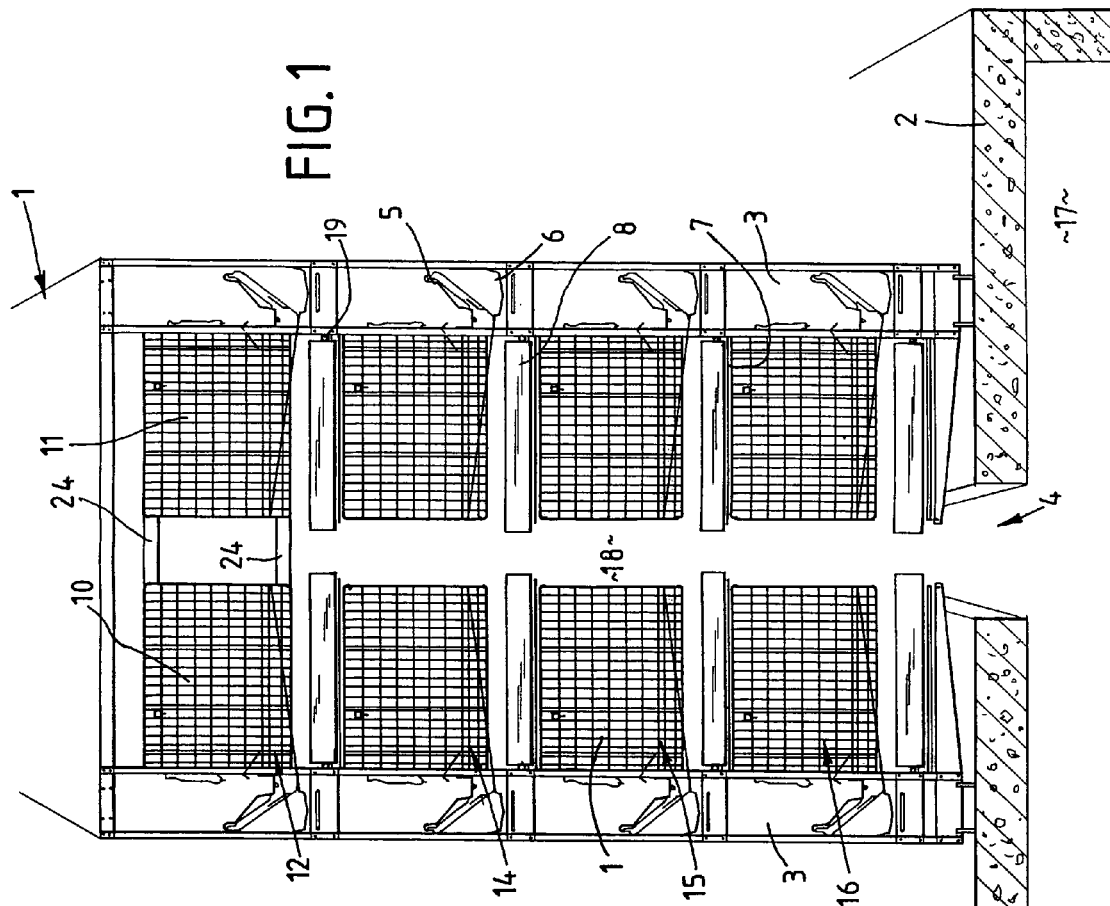
Figure 4:
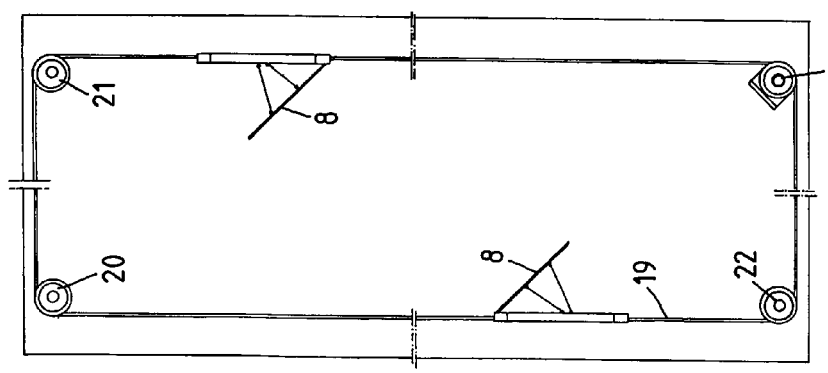

In the following, an embodiment example of the invention is explained with the aid of the drawings. The drawings show:

FIG. 1: a view of a cage battery, of which, for the sake of clarity, only the first cages are represented FIG. 2: on an enlarged scale, a detail view for illustration of the arrangement of the manure scraper FIG. 3: a plan view of two manure plates with scrapers arranged above them FIG. 4: the arrangement of the circulating traction cable for the scrapers, in a schematic view In FIG. 1, labeled as 1 is a battery of cages, the cages being arranged one atop another in tiers 12, 14, 15, and 16. At the same time, two cages are arranged facing each other in each tier, namely the cages 10 and 11.

A multiplicity of such cages 10 and 11 are arranged in succession in the longitudinal direction of the battery 1.

The two upper cages 10 and 11 are linked to each other through connecting means 24 in order to increase the stability of the battery as a whole.

Between the cages of each of the tiers 12 and 14, 14 and 15, 15 and 16, as well as between tier 16 and the top side of the cover plate 2 of a manure pit 17 there is an open space, in which is arranged a manure scraper 8. As FIG. 2 shows, the manure scraper 8 is attached to a guidance structure 9 and is connected to a traction cable 19, as shown in FIGS. 2 and 4.

Arranged in each case on the top side of each cage 10 and 11 of each tier is a manure plate 7, so that the manure of the cages arranged above these cannot fall onto the animals in the cages arranged below. Rather, during the operation of the traction cable 19 the manure that falls onto the manure plates 7 is conveyed by the manure scraper 8, which is arranged obliquely with respect to the longitudinal extension of the manure plate 7, towards the center and into an open space 18 between two cages 10 and 11 facing each other, as FIG. 3 clearly shows. Here, the manure drops and reaches a passage 4 in the cover plate 2 of the manure pit 17.

Thus, in this way the manure is not, as in the prior art, deposited at the end of a battery towards the front, but rather, seen over the entire longitudinal axis of the battery, is conveyed centrally into the manure pit 17 arranged underneath, where it can be broadly distributed through appropriate, known mechanical means, so that only a semi-yearly or yearly emptying of the manure pit is necessary. It should be mentioned here that the manure pit is ventilated, so that a drying out of the manure already takes place here.

FIG. 4 shows that the actual manure scrapers 8 are arranged on a circulating traction cable 19, which is guided around idler pulleys 20, 21, and 22. An additional pulley 23 is designed as a drive pulley and is driven forward and backward, thus in an oscillating manner, so that the manure scrapers are moved back and forth under the actual cages.

The actual manure scrapers 8 are here attached to the traction cable 19 in an articulated manner, via a prop-and-lever structure 25 having two equal-length levers 26, 27, such that, depending on the direction of pull, the scrapers flip over and always take on the inclined position represented in FIG. 3, i.e. they are inclined at an angle greater than 90° in the direction of pull. The direction of pull is indicated in FIG. 3 by the arrows F1 and F2.

Thus, achieved through this arrangement, as shown clearly in FIG. 3, is that the manure scrapers 8 are oriented obliquely with respect to the longitudinal axis of the battery of cages and that the two cages 10 and 11 facing each other are each equipped with a manure scraper 8 that can be moved in the opposite direction, as the arrows F1 and F2 make clear.

When the manure scraper 8 has reached its end position and the conveying apparatus of the manure scraper 8 is reversed, the lever arrangement 25 attached to the manure scraper 8 appropriately flips over and now supports the manure scraper 8 in the other direction.

What is claimed is:

1. Cage arrangement for poultry having cage batteries arranged above a manure pit, each battery displaying two cages facing each other, wherein cages are arranged one atop another in tiers, said cage arrangement comprises:

a manure scraper arranged in each tier underneath each cage;

wherein the two cages facing each other define an open space substantially free of obstruction; and a cover plate of the manure pit defining a passage located under the open space for manure conveyed into the open space by the manure scrapers;

wherein the manure scrapers are driven in a back-and-forth manner and are arranged on a traction cable that circulates around idler pulleys, and wherein a drive pulley drives the traction cable back and forth.

2. Cage arrangement as claimed in claim 1, wherein a manure plate is provided below each cage and wherein the associated manure scraper glides upon the respective manure plate.

3. Cage arrangement as claimed in claim 1, wherein the cages of the uppermost tier are connected to each other to bridge the open space.

* * * * *